United States Patent [19]

Gates et al.

[11] 4,304,810
[45] Dec. 8, 1981

[54] APPARATUS FOR AND METHOD OF MAKING FOAM ARTICLES HAVING DENSIFIED REINFORCING REGIONS

[75] Inventors: Richard L. Gates, Sheboygan, Wis.; Dennis J. Fuller, Beaver; Thomas L. Wolford, Ellwood City, both of Pa.

[73] Assignee: Arco Polymers, Inc., Philadelphia, Pa.

[21] Appl. No.: 169,706

[22] Filed: Jul. 17, 1980

[51] Int. Cl.³ .............................................. B29D 27/00
[52] U.S. Cl. ..................................... 428/218; 264/45.4; 264/45.5; 264/51; 264/DIG. 10; 264/DIG. 11; 264/DIG. 83; 425/4 R; 428/310.5; 428/316.6; 521/146; 521/918
[58] Field of Search ........................ 264/45.4, 45.5, 51, 264/DIG. 9, DIG. 10, DIG. 83, DIG. 4, DIG. 11; 428/218; 425/315, 4 R; 521/918, 146

[56] References Cited

U.S. PATENT DOCUMENTS

| | | | |
|---|---|---|---|
| 2,950,505 | 8/1960 | Frank | 264/45.4 |
| 3,225,124 | 12/1965 | Wallace | 264/45.5 X |
| 3,244,346 | 4/1966 | Tijunelis | 264/DIG. 4 |
| 3,445,406 | 5/1969 | Koch | 264/DIG. 4 |
| 3,452,390 | 7/1969 | Borcovec | 264/DIG. 9 |
| 3,767,742 | 10/1973 | Robin | 264/DIG. 83 |
| 3,773,873 | 11/1973 | Spaak et al. | 264/DIG. 83 |
| 3,793,415 | 2/1974 | Smith | 264/DIG. 83 |
| 3,825,637 | 7/1974 | Robin | 264/DIG. 83 |
| 3,871,801 | 3/1975 | Buchmann | 264/DIG. 10 |
| 3,876,494 | 4/1975 | Ogawa et al. | 264/DIG. 4 |
| 3,936,518 | 2/1976 | Soda et al. | 428/218 X |
| 3,953,560 | 4/1976 | Klein | 264/DIG. 83 |
| 3,954,926 | 5/1976 | Pahl et al. | 264/DIG. 83 |
| 3,983,196 | 9/1976 | Gray | 264/DIG. 83 |
| 4,154,784 | 5/1979 | Ruhl | 264/DIG. 83 |

*Primary Examiner*—Philip Anderson
*Attorney, Agent, or Firm*—Dennis M. Kozak

[57] ABSTRACT

Low density, lightweight foam articles may be provided with certain portions or regions thereof, that are reinforced, having higher density and strength, obtained by compression of the foam in these locations, during or after formation of the foam. Such locations may be made sufficiently strong and dense to allow the article to be attached in place by fastening means, imbedded therein. The increase in density can be as much as from 5 pcf to 10 pcf or higher, depending upon the particular application.

Many foam materials, capable of being molded, extruded, or otherwise shaped to a predetermined configuration, may be made with this combination of high and low density, including foams of styrenic polymer or copolymer compositions, urethanes, vinyls, and even non-thermoplastic based materials, such as phenolic foams.

8 Claims, 2 Drawing Figures

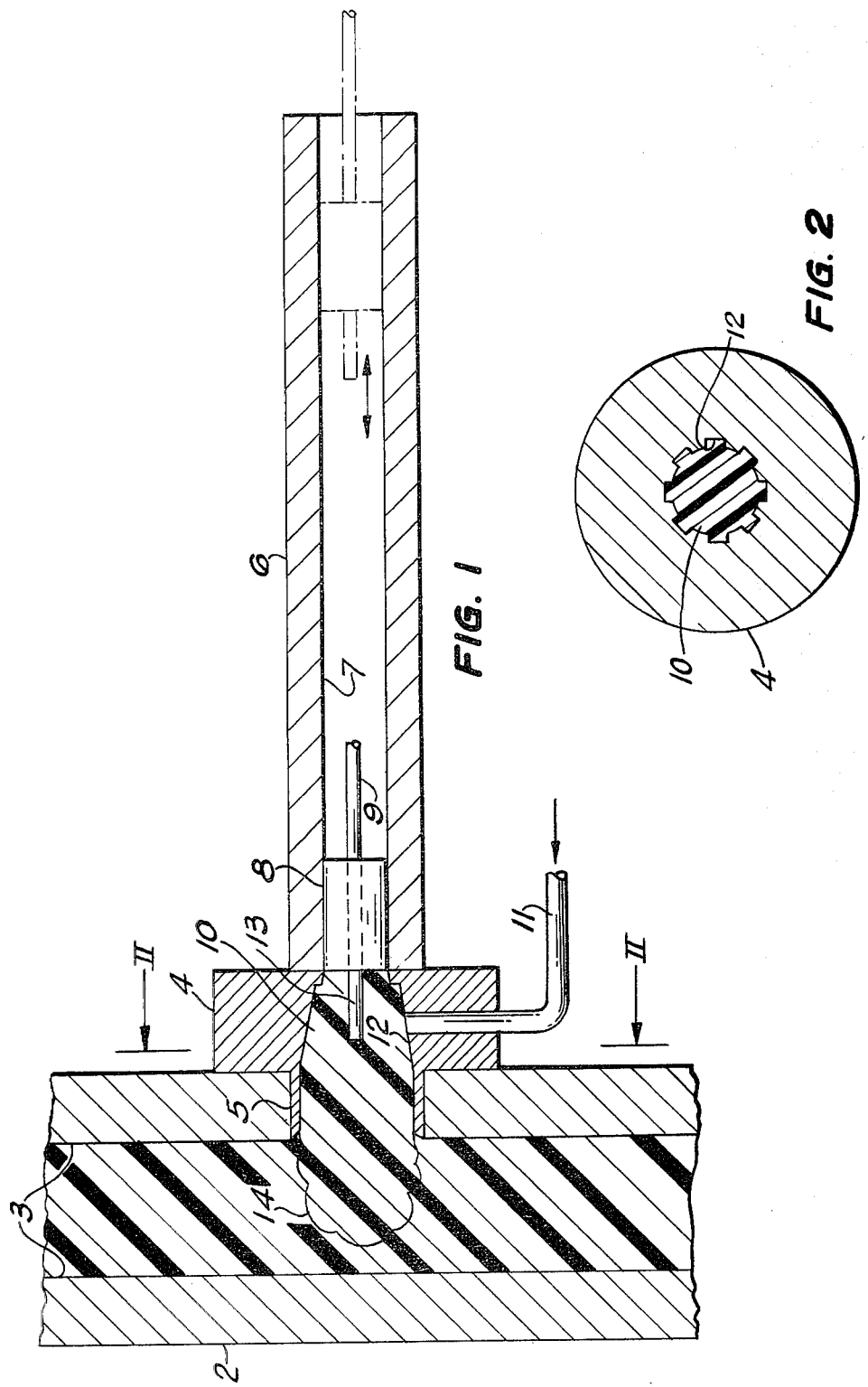

APPARATUS FOR AND METHOD OF MAKING FOAM ARTICLES HAVING DENSIFIED REINFORCING REGIONS

BACKGROUND OF THE INVENTION

In a great many industrial fields, weight reduction of parts is becoming of increasing importance. The automotive industry is an excellent example of this trend. In the current pressure to conserve energy, auto manufacturers are designing cars that will conserve fuel, and a large part of this effort is being accomplished by reduction in weight of all possible parts going into the making of an automobile. Aluminum and plastics are being substituted for steel in applications where this is appropriate. Similarly, many attempts are being made to substitute plastic foams for prior conventional fabrics and/or solid plastic materials. One of the problems encountered in the use of foams, especially low density, lightweight foam materials, is that articles made therefrom must still be fastened to other parts, or secured in place in an intended assembled position, and foam articles require reinforcement or other means to be useful in such an application. The loss in strength encountered when a material is changed into a light low density article made of foam can defeat its utility and usefulness. Accordingly, the making of foam articles, having reinforced areas or regions, such as regions of higher density and strength, is of tremendous advantage in promoting the use of foam articles for lightening the weight of vehicles.

It has been proposed to incorporate supplemental and stronger fastening elements within the foam article to overcome this problem, but if the foam is of insufficient strength, then it may not have the holding power to securely hold the supplementary fastening means, and this does not provide a satisfactory solution. If the lightness of the article results in a sufficient loss of strength, then there can be no assurance that the article is capable of holding any such supplementary fastening means.

The solution provided by the present invention is to provide a lightweight, low density foam article, but which can be provided with higher density, greater strength regions or portions for use, for example, for fastening.

By way of illustration, a foamed styrenic copolymer thermoplastic composition having a density of 5 to 6 pounds per cubic foot, will have an average screw-pull strength of only about 50 pounds or less. The same material, if it had a density of say about 12 to 13 pounds per cubic foot, would have an average screw-pull strength of about 150 pounds; and at 15 pounds per cubic foot density, the average screw-pull strength of the foam material would be about 200 pounds. Thus, the present invention has for a specific object thereof the provision of a process and apparatus for making foamed articles, having generally a relatively low density overall, but which in the particular desired regions or portions will have a higher density of, say 12, 15, or even 20 pounds, and thus provide desired strength in these particular areas or regions.

SUMMARY OF PRESENT INVENTION

In the production of foam articles, which may be made by extrusion, molding, injection molding, reaction injection molding, and the like, densified regions or portions of the foam article are provided at desired predetermined locations. These reinforced densified portions may serve the purpose of providing locations where fastening means may be disposed to secure the foam article in place, or for other purposes, such as areas of unusual wear or rough handling, without destroying the usefulness of the foam article as a whole. For example, an article that would be highly advantageous in the automotive field would be a lightweight foam instrument panel, having a relatively low density, such as 5 or 6 pounds per cubic foot, but would have higher density, stronger portions or regions, which would provide sufficient strength to permit the use of screws or other fasteners with retention strength adequate to at least satisfy the 100 pound pull strength imposed by many designers. Thus, the overall weight reduction achieved by using a foam instrument panel could be significant, but at the desired locations, ample strength is provided to secure the article in place. As another example, a lightweight container, having excellent insulating properties, may be provided, such as for holding icecubes, and at the same time, securely fixed handles can be fastened at densified regions of the container to provide a functional and ornamental ice bucket. As another solution, the reinforced densified regions of foam could be shaped to provide the desired handles without requiring additional parts for attachment to the foam container.

DETAILED DESCRIPTION OF THE INVENTION

For purposes of illustration the present invention will be described in connection with the molding of pre-expandable particles of thermoplastic expandable polymers such as polystyrene or copolymers of polystyrene and maleic anhydride (including rubber modified anhydride for high impact). However, it will be understood the invention can be applied to foamed articles produced in a mold to provide a predetermined shape for such articles, but made of foams other than those of styrene polymer compositions, such as vinyls, urethanes and even phenolic foams.

The sole requirement in carrying out the present invention is the compression of the foam from the overall light density used to achieve weight reduction to a higher reinforced, denser region having the desired strength at predetermined regions of the foam articles while achieving weight loss which also achieves cost reduction because less material is used. With prices of foamable plastics increasing as crude oil prices go up, these savings in material costs can be significant. To accomplish this basic result, the simplest facilities required are a piston arrangement located in the mold wall adapted to move forward towards the mold cavity and compress the light foam to a more dense, stronger material. The amount of movement of the piston and the character of the foam varies the amount of compression obtained and thus the increase in density and strength of the densified region. The density may be increased as much as 5 pounds per cubic foot or 10 pcf or more as the occassion demands. If desired, a recess may be formed in the mold wall to hold a supply of foamable particles for the desired amount of compression. The recess may be configured as wanted to produce, for example, a projection or boss on the surface of the article to facilitate the use of fastening means.

The compression or densification, in the case of pre-expanded thermoplastic particles, denoted as "prepuff" in the expandable polystyrene industry, may be accomplished prior to the heating for fusing together the particles as they expand in the mold or may be done simultaneously with the heating, expansion and fusion of the thermoplastic particles. In the case of polyurethanes, the compression may occur during the first formation of the foam or later during the foaming prior to completion of the curing of the material.

In the drawings,

FIG. 1 is a schematic cross sectional view of a portion of a mold cavity showing portions of the mold cavity walls and a piston arrangement mounted on a mold wall to produce the compression or densification.

FIG. 2 is a cross sectional view taken on line II—II of FIG. 1 to illustrate the compressed or densified projection or boss formed on the surface of the foamed article.

Looking at FIG. 1, portions of the mold cavity walls are indicated by the numerals 1 and 2 to define a mold cavity 3 which during the molding cycle may be filled with prepuff from which a final molded foam article will be produced. The mold cavity walls 1 and 2 which are only partially shown in this schematic view form an enclosure (mold cavity 3) which defines the final shape of the article to be made, and are a part of the molding apparatus (not shown in this instance) being well known in the molding art. The mold cavity walls 1 and 2 are usually mounted in a press to permit them to separate when removing a molded part and to close to form the mold cavity indicated by numeral 3 when it is desired to fill the mold and heat it to form a foam article. Generally, the molding apparatus includes a steam chest which encloses the mold cavity walls and steam is fed thereto to heat the mold cavity walls and also to allow steam to enter the mold cavity through vents in the mold cavity walls having small openings therethrough so as not to cause undue marring of the surface of the molded article and to prevent softened and thus flowable plastic from escaping from the mold cavity. In some forms of molding apparatus, the steam chest surrounding the mold cavity walls is also fed with a coolant (usually cool water) to cool the molded foam article and facilitate its earlier removal after fusion of the thermoplastic particles.

In the present invention the means for forming a higher density region in the foam article is shown in FIG. 1 and comprises a collar 4 mounted on the exterior of the mold cavity wall 2 and having a hollow generally cylindrical portion 5 passing through the mold wall. A cylinder 6 is securely fastened to the collar 4 and has a bore 7 therethrough in which is mounted for sliding reciprocal movement a piston 8 and piston rod 9 actuated by suitable well known means (not shown). The piston 8 and rod 9 are shown in their withdrawn position in dotted outline in the bore 7.

This arrangement allows the formation of a projection or boss 10 on the outer surface of the molded foam article of higher density foam than the balance of the molded article for securely holding fastening means such as a screw when securing the foam article in place. To insure that the higher density region or boss is properly fused into an integral piece supplementary steam may be fed from a suitable source not shown through a tube or conduit 11 into and through the collar 4 and into grooves 12 in the collar 4. The grooves 12 then result in the boss of the foamed article having ribs which serve to further strengthen.

The piston rod 9 may be hollow and act as a steam conduit feeding a steam probe 13 which extends outwardly from the head of the piston 8, injecting steam into the center of the boss 10 to cause adequate fusion in this area. If desired, an alternative construction would use a hollow piston 8, the head of the piston being formed by an apertured grill or core vent to allow steam to pass through the piston head into the recess in the mold cavity wall 1 for an area up to substantially the full head of the piston. This provides greater heat transfer and increased fusion at the top of the boss 10 on the foam article. With this construction, the steam probe 13 may be rendered non-active for steam passage therethrough and merely serve as a pin to form a pilot hole in the top of the boss 10.

In both of the embodiments described it is preferable that the hollow piston rod 9 be provided with a valve (not shown) so that it may be connected to a vacuum source (not shown). Thus, during the filling cycle of the molding process a vacuum may be applied through the probe 13 and/or the head of the hollow piston 8 to exhaust air in the mold cavity in the area of the recess formed in the collar 4 and hollow portion 5, insuring that the recess will be filled with thermoplastic particles.

In operation, as the mold cavity is filled with preexpanded thermoplastic particles, the piston is in its withdrawn position and the particles also fill the recess formed in the hollow opening of the collar portion 5, the collar 4 and even into a portion of the bore 7. As steam is being injected into the mold cavity to expand and fuse the thermoplastic particles, and preferably before the plastic material reaches its softening point temperature, the piston 8 is advanced to its forward position thus compressing the light low density preexpanded particles in the recess formed by the hollow portion 5 and the collar 4. This compressed region of thermoplastic particles may extend outwardly of the recess into the mold cavity to form a higher density region as indicated in FIG. 1 by the numeral 14. Steam may also be forced to flow through the conduit 11 into the grooved area of the collar 4 to assist in expanding and fusing the particles which form the boss 10 projecting from the exterior surface of the foamed article being made. A manifold may be provided in the grooved portion of the interior of the collar 4 to allow steam to flow readily all around the circumference of the boss 10 with suitable screens or the like to prevent flow of plastic into such manifold. Steam may also be forced to flow from a suitable source (not shown) through the piston rod 9 and the steam probe 13 on the head of the piston 8 to heat, expand and fuse the central densified portion of the boss 10. As another advantage of this arrangement, the tip of the probe or jet 13 provides a small opening centrally located within the top of the boss 10 to provide a pilot hole for the introduction of a screw threaded fastening means.

Another embodiment of the present invention would be to locate the recess on one side of the mold cavity and to compress foam into the recess by a piston moving from the opposite wall of the mold cavity but stopping a desired distance from such opposite wall, rather than having the piston and recess disposed on the same mold cavity wall as shown in FIG. 1. This would work well when the mold cavity is not very thick at the point where the reinforcement is desired. Alternatively, the foam in the mold cavity could be compressed without the use of a recess, by the use of a single piston, or by two pistons moving towards each other from opposite mold cavity walls and even extending into the mold cavity to form a thinner section of the foam article at this higher density location. Thus, it can be seen that the way in which the high density foam locations or strengthened regions are formed or where they may be located can be widely varied according to the foam article to be produced and the requirements for fastening the same.

In a specific study of the strengths that can be achieved, foam polymeric pieces were made at different densities and the average screw pull strengths were measured for each density. The foam test article was molded from a styrene-maleic anhydride expandable copolymer sold by ARCO Polymers, Inc. under the trademark DYTHERM. In the test, a standard #8 wood screw was secured into the sample and the pull required to remove the screw was measured at a pull rate of 1" per minute. At a density of approximately 7.5 pcf the average screw pull strength was about 80 lbs.; at an approximate density of about 10–11 pcf, the screw pull strength was about 130 lbs.; and at a density of approximately 16 pcf the average pull strength was about 220 lbs.

Another test was conducted to measure running torque and stripping torque in addition to pull strength. The tests were in conjunction with DYTHERM (styrene-maleic copolymer) strips ⅜" thick and involved the use of standard #10 sheet metal screws. Running torque is defined as the torque in inch-pounds required to drive the screw into the foam until it bottoms; while stripping torque is that required (in inch-pounds) to continue driving the screw sample after it bottoms, resulting in the stripping of the threads formed by the screw in the foam. All foam samples had a density of approximately 7.4 pcf. At the densified location, average running torque was about 7.22 inch-pounds; the average stripping torque was about 33.5 inch-pounds. The average pull strength was about 124 lbs.

While the present invention has been described in conjunction with expandable styrene polymer compositions, it will be understood that the invention may be practiced with many other foams such as that produced from expandable polystyrene homopolymers, other styrenic copolymers, polyimides, rubber-modified polymers, copolymers as well as blends of such materials. Other polymeric foams useful in the invention, include polyvinyl chlorides, polyethylene, polypropylene, polyurethanes, copolymers, and blends thereof, etc. Also useful as foams to which the present invention is applicable are foams made from phenolic resins, polyesters and thermosetting foams.

Thermoplastic foams are preferred for the present invention, and it is also preferred that the compression to give the foam a higher density be accomplished as soon as the pre-expanded thermoplastic particles have completely filled the mold cavity. The compression may also be accomplished when the steam has just started to enter the mold cavity or when the material is at a temperature above its softening point. The compression of pre-expanded material prior to heating may be of value when greater compression, and thus correspondingly increased strength is desired for a particular application.

We claim:

1. The method of making a foamed article molded to a predetermined shape which comprises:
    (a) filling a mold cavity with a heated resinous foam material having an average relatively low density,
    (b) filling at least one recess in communication with said mold cavity with said heated foam material,
    (c) compressing the foam in said recess to form a higher density foam in said recess and in the area of said mold cavity adjacent said recess, and
    (d) solidifying said foam into an integral foamed article of said predetermined shape having at least one region of foam with a density higher than that prevailing generally throughout the balance of said article.

2. The method of making molded foam articles from an expandable thermoplastic material in particulate form, said article having locally densified portions which comprises providing at least one recess in a mold cavity wall and a piston member mounted adjacent to and associated with said recess for reciprocal movement therein, filling the mold cavity and said recess with a predetermined amount of expandable resinous particles while the piston member is in a retracted position, moving said piston member a predetermined amount to compress the thermoplastic particles in said recess, fusing the expandable thermoplastic particles in said mold cavity to form a foamed thermoplastic part coinciding with the shape of said mold cavity, having a predetermined low density throughout the article and a higher density in the area of said recess.

3. The method claimed in claim 2 in which said material includes an expandable styrenic polymer composition in particulate form.

4. A molded foam article having a low density foam in a predetermined shape, and at least one region of a higher densified foam disposed at a predetermined location in said article, and obtained by compression of said region of foam by the method of claims 1 or 2.

5. An article as claimed in claim 4 made from an expandable thermoplastic polymeric material.

6. An article as claimed in claim 4 made from an expandable thermoplastic polymeric material in which said compression of foam occurs prior to or while said material is at a temperature above the softening point of said thermoplastic.

7. An article as claimed in claim 4 made from an expandable styrenic polymeric composition.

8. Apparatus for molding expandable thermoplastic particles to produce a shaped foam article therefrom which comprises:
    (a) a mold cavity having at least one recess in communication with said mold cavity,
    (b) means for placing a measured amount of said particles in said mold cavity and in said recess,
    (c) means for heating said particles,
    (d) means associated with said mold cavity for compressing the portion of said particles in said recess during foaming thereof to provide at least one denser region of particles,
    (e) means for fusing said foamed particles into an integral article, and
    (f) means for removing said article from said mold.

* * * * *